United States Patent [19]

Robertson, Sr. et al.

[11] Patent Number: 4,700,555
[45] Date of Patent: Oct. 20, 1987

[54] ANTI-THEFT DEVICE

[76] Inventors: Nathaniel Robertson, Sr.; Nathaniel Robertson, both of 60 Broad Gully Road, Diamond Creek, 3089, Victoria, Australia

[21] Appl. No.: 865,304

[22] Filed: May 21, 1986

[30] Foreign Application Priority Data

May 21, 1985 [AU] Australia ............................. PH00685
Sep. 19, 1985 [AU] Australia ............................. PH02501
Nov. 15, 1985 [AU] Australia ............................. PH03423

[51] Int. Cl.⁴ ............................................. B60R 25/08
[52] U.S. Cl. ..................................................... 70/203
[58] Field of Search ................................. 70/198–203, 70/238, 256

[56] References Cited

U.S. PATENT DOCUMENTS

| 1,181,378 | 5/1916 | Eckart | 70/200 |
| 1,318,443 | 10/1919 | Gimperling | 70/203 |
| 1,444,935 | 2/1923 | Mokracek | 70/200 |
| 3,665,739 | 5/1972 | Boll | 70/237 |
| 4,076,095 | 2/1978 | Adamski | 180/114 |
| 4,333,326 | 6/1982 | Winters | 70/203 |
| 4,493,198 | 1/1985 | Brown | 70/203 |

FOREIGN PATENT DOCUMENTS

| 19509 | of 1924 | Australia . |
| 9279 | of 1927 | Australia . |
| 151373 | 8/1952 | Australia . |
| 155825 | 9/1952 | Australia . |
| 164895 | 4/1954 | Australia . |
| 211389 | 4/1956 | Australia . |
| 281821 | 8/1965 | Australia . |
| 0085257 | 10/1983 | European Pat. Off. . |
| 2443946 | 11/1980 | France | 70/203 |
| 2543084 | 9/1984 | France . |
| 2063194 | 6/1981 | United Kingdom | 70/238 |
| 2091656 | 8/1982 | United Kingdom . |
| 2098149 | 11/1982 | United Kingdom . |
| 2111445 | 7/1983 | United Kingdom . |
| 2114205 | 8/1983 | United Kingdom . |

Primary Examiner—James L. Ridgill, Jr.
Attorney, Agent, or Firm—Sughrue, Mion, Zinn, Macpeak & Seas

[57] ABSTRACT

A vehicle anti-theft device is comprised of two parallel spaced apart vertically extending supports having angularly bent base portions adapted to rest on the floor of the vehicle on opposite sides of the brake pedal lever. A transverse bar is welded to the supports and is adapted to underlie the brake pedal lever. The transverse bar is provided with an upturned end portion at one end thereof having a hole therein. A locking bar is adapted to extend substantially parallel to the transverse bar above the brake pedal support lever and is provided with a spigot at one end which is adapted to be inserted in the hole in the upright end portion of the transverse bar. The opposite end of the locking bar is provided with an aperture which will be aligned with a corresponding aperture in the transverse bar when the spigot is fully inserted in the hole so that a padlock may be inserted through the aligned aperture. The transverse bar or a separate bar secured to one or more of the upright supports is adapted to extend beneath the accelerator to prevent the actuation thereof while the brake pedal lever is prevented from operative movement by the transverse bar.

9 Claims, 5 Drawing Figures

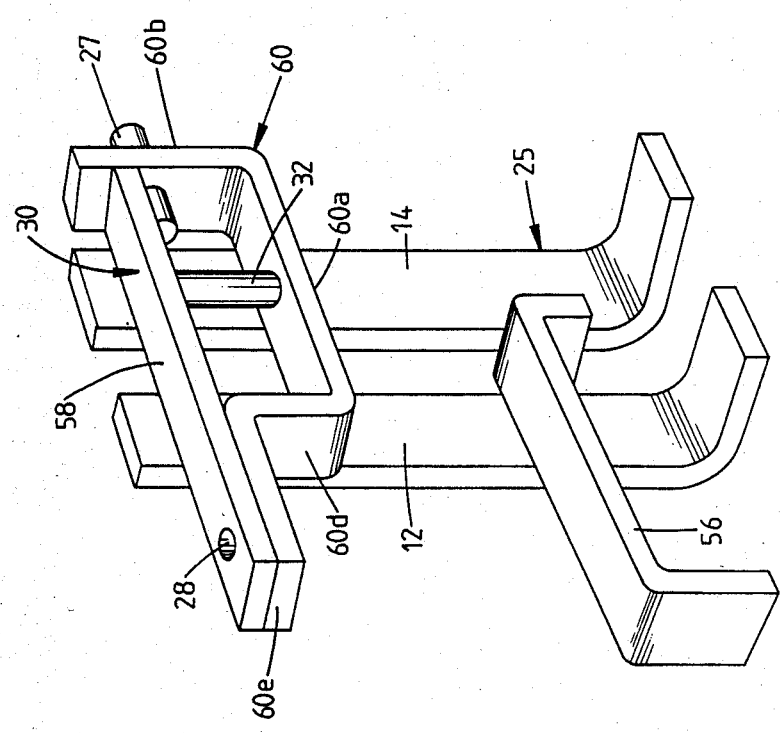

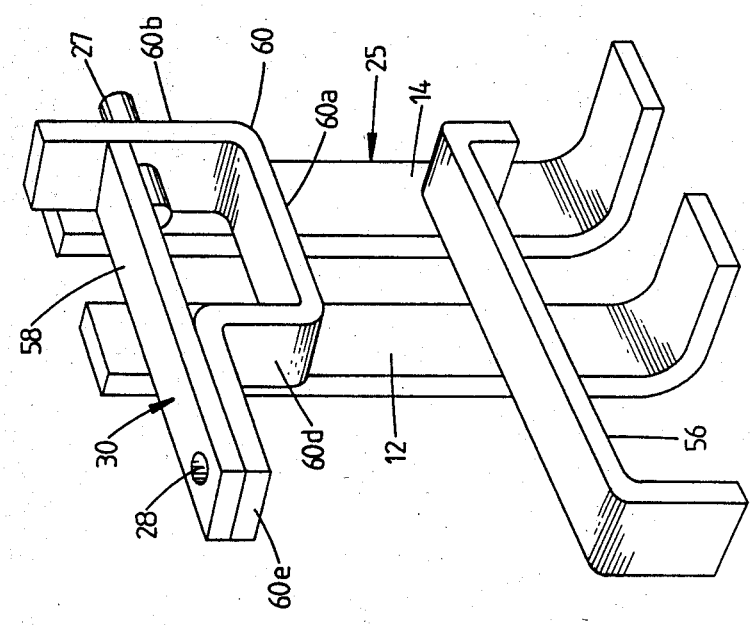

ANTI-THEFT DEVICE

BACKGROUND OF THE INVENTION (i) Field of the Invention

This invention relates to an anti-theft device for a vehicle.

(ii) Prior Art

Various types of mechanical device for preventing unauthorised operation of vehicles are known in the art. Arrangements operating by latching of a brake or clutch pedal of the vehicle are for example described in the following patent specifications;

EP No. 0 085 257 (M. A. Thomas), GB No. 2 063 194 A (T. F. Scott), FR No. 2 543 084 (M. Barroso), GB No. 2 091 656 A (D. B. Cowie), FR No. 2 443 946 (J-P. Sourbe), AU Nos. 281, 821 (41,319/64)) (Kitty Zaidener), AU No. 14421/76 (H. Hart), AU No. 5901/66 (D. W. H. Clark), AU No. 19,509/24 (R. Jenkins), V. Black), AU Nos. 155, 825 (531551) (J. D. McArthur), AU No. 7583/52 (E. J. Kelly), AU No. 9359/52 (F. Anderson), AU Nos. 164, 895 (17, 259/53) (G. Harvey), AU Nos. 211 389 (12,671/55) (W. A. Denny).

Of these, AU No. 281, 82 and AU No. 14421/76 describe arrangements whereby the brake or clutch pedal is latched to the steering wheel of the vehicle. Generally, these devices are required to be of some length and, while offering advantages in the terms of ease of affixment are generally inconvenient to store when not in use and are susceptible to unauthorised release by breakage, such as by the use of bolt cutters.

The other devices described in the listed publications are effective to act directly on the brake or clutch pedal, or the accelerator pedal of the vehicle, or some part of the structure associated with the pedals. The arrangements in AU No. 19, 509/24 and AU No. 164,895 use slidable latching members and, while effective, are relatively complex construction and require fixed installation in the vehicle, which is generally inconvenient. AU No. 9279/79 describes a device which has a rotatable latching member, but this too requires fixed installation in the vehicle, as is also the case with the locking device of AU No. 155, 825.

The device described in GB No. 2091656 is of two-part construction, one part being slideable on the other and the two parts being spring-loaded. An affixed key-actuated lock is provided. This device is of rather complex construction. Specification AU No. 9359/52 describes an arrangement where a padlock is used to latch the arm which carries the clutch pedal of the vehicle. This requires structural modification of the vehicle and is undesirable for that reason.

The remaining of the first above listed publications describe arrangements having one, two or more parts which, in co-operation with a separate padlock, are used to effect latching. Of these, the arrangements in AU Nos. 151, 373 (4629/51), AU No. 7583/52 and AU No. 211, 389 are designed to encase the support arm of the relevant pedal so as to act between the pedal and the floor opening of the vehicle (through an opening in which floor the arm extends) to prevent axial depression of the pedal. Whilst simple, compact and effective, these devices are, however, of limited use in modern vehicles where it unusual for the operating arm of the pedal to be moved lengthwise during actuation. Generally, pivotal movement of the relevant arm occurs. This difficulty is not present in the construction of FR No. 2, 543, 084 which uses a single part structure with a "U" shaped bracked which is moved sidewardly to encompass the pedal arms of the vehicle. One of the arrangements described in EP No. 0, 085, 257 is somewhat similar in that it has a one piece "U" shaped structure which is however entered around one of the operating arms by upward movement. Generally, however, manoevering of one piece units around the brake and/or clutch pedal support arms is difficult in the confined space of an automobile, so that these devices are inconvenient to use. Another arrangement described in EP No. 0 85, 257 is of two part construction where one part is separable from the other. However this requires one of the separate parts to be passed through well-spaced openings in the other, and is again relatively inconvenient of use. The arrangements of GB No. 2, 063, 194 A, FR No. 2, 443, 946 and AU No. 5901/66 have the two parts hinged together. Although the problem of alignment of the parts is thereby made simple, the fact that the component parts cannot be completely separated still leaves these devices with the disadvantage of being difficult to position for use. An object of the invention is to provide a vehicle anti-theft device which is of simple construction and which is simple to install and lock into position.

BRIEF SUMMARY OF THE INVENTION

According to the present invention there is provided an anti-theft device for a vehicle, which in use is positioned between an operating pedal of the vehicle and the floor of the vehicle for preventing operation of the pedal, whilst latching, in surrounding relationship, the operating pedal to prevent removal of the anti-theft device from the pedal, characterised in that said parts are separate, one of said parts having an opening therein and the other of which parts having a projection which is enterable into the opening whereby the two parts are then positionable with apertures therein in alignment for receipt of a locking device whereby when the locking device is so received, the projection is precluded from removal from the opening, to prevent dismantling of the anti-theft device without release of the locking device.

BRIEF DESCRIPTION OF THE SEVERAL VIEWS OF THE ACCOMPANYING DRAWINGS

The invention is further described by way of example only with reference to the accompanying drawings in which:

FIGS. 4 and 5 are respective views of two further forms of device constructed in accordance with the invention.

DETAILED DESCRIPTION

Figure 1:
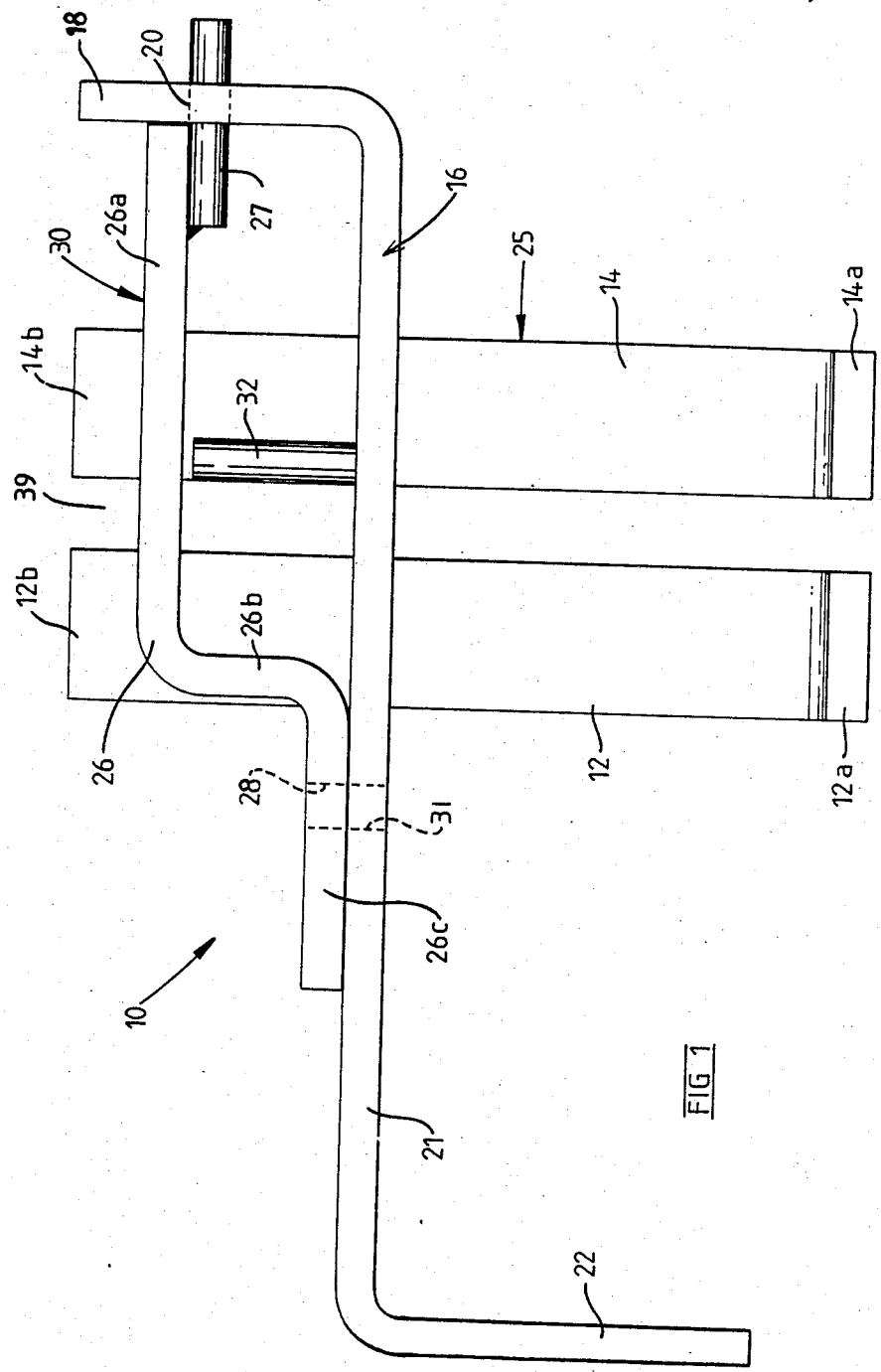
FIG. 1 is a front view of a device constructed in accordance with the invention.

The device 10 shown includes a part 25 adapted to be positioned on the floor of a vehicle and for capturing of the brake pedal of the vehicle, more particularly the support structure of the pedal, which is usually in the form of a pivotal arm which supports a pad which is acted on by the foot of the vehicle user to operate the pedal. In most vehicles, this arm or support structure extends from an upper position, forward of the location of the brake pad, rearwardly and downwardly to the brake pad. Part 25 of device 10 includes first and second upright supports 12 and 14 formed from bent bar stock and positioned side by side. These are spaced apart a distance somewhat greater than the side to side dimension of the brake pad support structure. Supports 12, 14 have, at lower ends thereof, out-turned base portions 12a and 14a which in use rest upon the floor of the vehicle whereby the supports 12 and 14 then extend upwardly from the base portions 12a, 14a, to upper ends 12b, 14b respectively.

Part 25 also includes a transverse bar 16 welded to the supports 12 and 14 and positioned at a location somewhat above the base portions 12a, 14a, thus joining supports 12 and 14. At one end, bar 16 extends sidewardly as viewed in FIG. 1 from support 14 to terminate at an upturned vertically extending first end portion 18. End portion 18 has an opening 20 therein. At the other side, the bar 16 extends, at a portion 21 thereof, from support 12, sidewardly of support 12 to a downwardly depending second end portion 22 which extends almost to the level of the base portions 12a, 14a of supports 12, 14.

A second part 30 of device 10 is in the form of a cranked locking bar 26 which is separate from part 25. This has parallel portions 26a, 26c, one at each end, interconnected by an intermediate portion 26b. Part 30 also includes a cylindrical spigot 27 which is welded to one end of bar 26 and which extends lengthwise from bar 26. When the bar 26 is positioned for use, spigot 27 extends through the opening 20 in portion 18 of bar 16. Also, when so positioned, bar portion 26a extends away from portion 18 of bar 16 generally parallel to, (but positioned in spaced relationship above) bar 16, thence past support 14 and over most of the width of support 12 until a location is reached at which the bar 26 extends downwardly, over the intermediate portion 26b thereof, to the level of the bar 16. The portion 26c of bar 26 extends normally from portion 26b and, in the position of bar 26 shown in FIG. 1, overlies and contacts the bar 16 at a location outboard of support 12.

A pin 32 is welded to bar 16 and extends upwardly therefrom to a height which is somewhat less than, but close to the height of the underside of the bar 26 above bar 16, when the bar 26 is in position. This pin is positioned so as, when viewed as shown in FIG. 1, it is positioned within the gap 39 formed between the supports 12 and 14.

The bar 26 has, in portion 26c, an aperture 28 which in the position of bar 26 shown in FIG. 1, is in line with an aperture 31 in bar 16.

Figure 2:
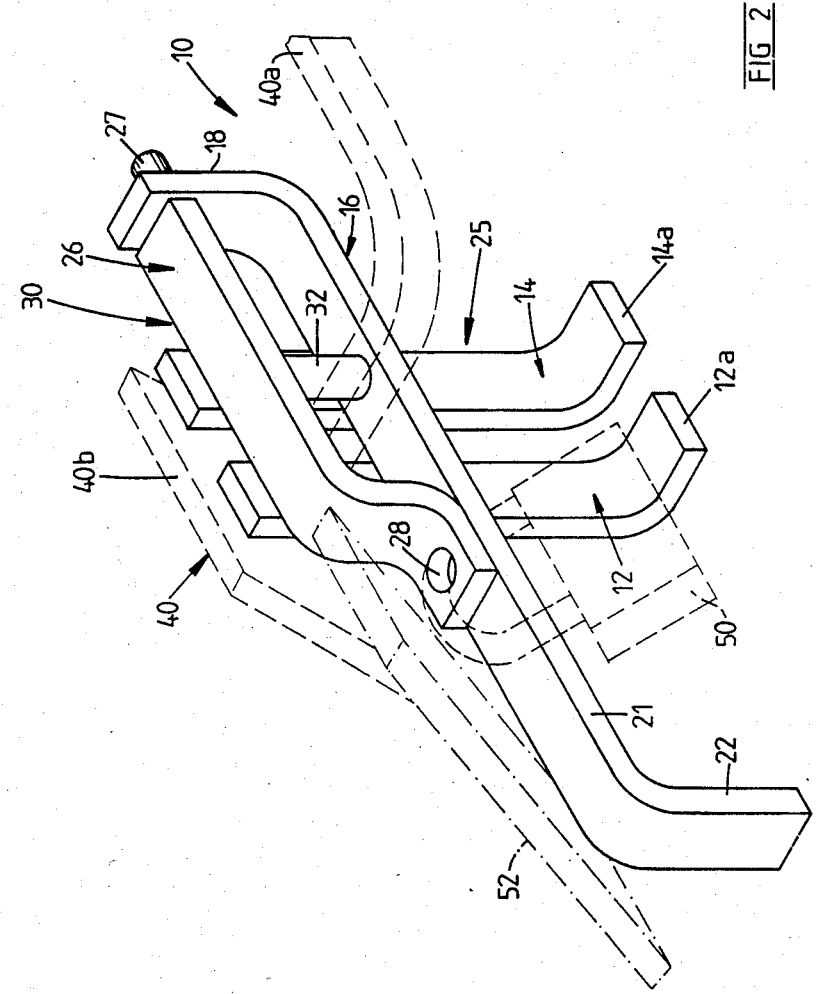
FIG. 2 is a perspective view of the device of FIG. 1 positioned for use.
Figure 3:
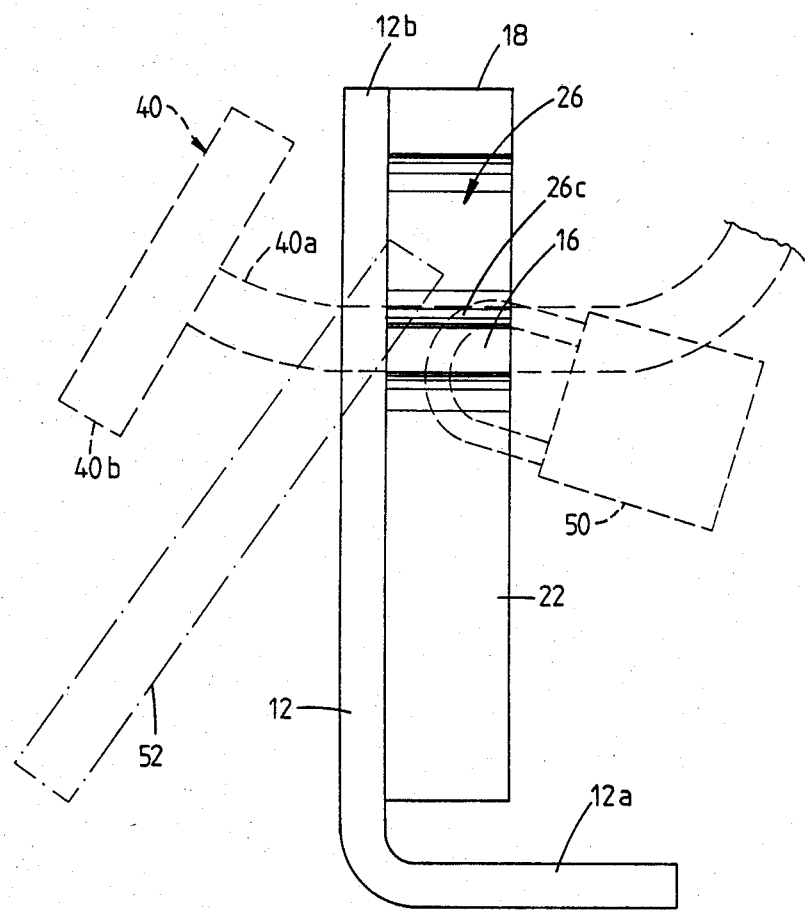
FIG. 3 is a side view of the device of FIG. 1.

As shown in FIGS. 2 and 3, the device 10 can be positioned to lock the brake pedal 40 of a motor vehicle by removing bar 26 and positioning part 25 on the floor of the vehicle with the base portions 12a 14a resting on the floor so that the supports 12 and 14 extend upwardly therefrom and so that the support structure 40a, of pedal 40, on the end of which the brake pad 40b is secured, extends in the "U"-shaped opening defined by gap 39 between the supports 12, 14 and immediately above the bar 16. Then, the support structure 40a can be captured between the supports 12, 14, and the above bar 16, by positioning the locking bar 26 as shown in FIG. 1. This assembly is simply effected by inserting the spigot 27 into the opening 20 by lengthwise sliding of bar 26 so that the bar 26 extends above the support structure 40a as shown in FIG. 2. Then, the portion 26c of the bar 26 may be locked to the bar 16 whereby the bar closes the gap 39 at the top thereof to prevent removal of the part 30 from part 25 of the device 10, and thereby to ensure that the support structure 40a is captured by the device 10. This locking may be effected by use of a padlock 50 as shown in FIG. 2 and 3, inserted through the aligned apertures 28 and 31.

When the device 10 is positioned as shown at FIG. 2, the portion 21 of the bar 16 which extends sidewardly from the support 12 is positioned so that the accelerator pedal 52 of the vehicle is at a side to side location between the support 12 and the portion 22 of bar 16. The portion 21 of the device 10 is then positioned under the accelerator pedal 52, so as to prevent depression of the accelerator pedal. At the same time, depression of the brake pedal 40 is precluded by interposition of the device 10 between the support structure 40a and the floor of the vehicle. The closed opening defined by gap 39 as closed at the lower end by locking bar 16 and at the upper end by bar 26 is of sufficiently small size compared with the size of the brake pedal pad 40b as to prevent device 10 from being removed from the brake pedal 40.

The pin 32 is provided simply for the purpose of assisting in positioning of the locking bar 26. In order to position the locking bar it may be first rested with the portion 26c on portion 21 of bar 16, and with the portion 26a of the bar 26 resting on the end of the pin 32. Then, the bar 26 may as described, be slid sidewardly of the part 30, to enter the spigot 27 into the opening 20. Location of the bar 26 in the correct position for aligning the axes of spigot 27 and opening 20, prior to this sliding, is facilitated by first engaging the side edge of the bar 16 against the upper portions of supports 12, 14. These portions limit side to side movement of the bar 16, in the front-to rear direction of the device 10, to a location at which the axes of the spigot 27 and opening 20 are aligned.

Some variation in the form of the device 10 may be necessary to accommodate different arrangements of brake pedals and accelerator pedals in different vehicles. In the device of FIG. 4, supports 12, 14 of similar form to those shown in FIG. 1 are employed. Here however, the portion of the device which is positioned under the accelerator pedal is in the form of an inverted u-shaped bar 56 welded to support 12. Also, the locking bar is in this case in the form of a simple linear element 58 having the spigot 27 at one end and aperture 28 at the other end. The bar 16 is replaced by a modified bar 60 of a generally "U"-shaped form having a base portion 60a welded to supports 12 and 14 and having an extension at one side with an upright portion 60b at the end thereof, which upright portion 60b has the opening 20 for receipt of spigot 27. Adjacent support 12, bar 60 has an upright portion 60d joining to part 60a. Portion 60d extends upwardly and then outwardly to terminate in an outward extension 60e on which portion the bar 58 may rest. Portion 60e has the aperture 31 therein. The pin 32 is again provided, in this case extending upwardly from portion 60a of bar 60.

FIG. 5 shows a device like the device of FIG. 4 but somewhat modified. Like parts are designated by like reference numbers in FIGS. 4 and 5. In the device of FIG. 5, the pin 32 is omitted and the bar 56 extended for extra strength, to be welded to both supports 12, 14.

In either of FIGS. 1, 4, 5 pin 27 may be welded to element 58 or otherwise formed such as by stamping.

The devices of FIGS. 1, 4, 5 operate to restrict the use of the vehicle accelerator pedal by interposition of part of the device below the accelerator pedal, but can alternatively be arranged to prevent the foot from operating the pedal by provision of a portion of the device which covers the pedal. The devices need not act on both the accelerator and brake pedals, and may act on only one of these. Alternatively or additionally, the device may be formed with an opening which is closed around the vehicle clutch pedal for rending the clutch pedal inoperative.

The devices of FIGS. 1, 4 and 5 may readily be fabricated from metal by cutting, bending and welding bar stock. In the constructions of FIGS. 1 and 4, the pin 32 may be omitted.

The described constructions have been advanced merely by way of explanation and many modifications may be made thereto within the scope of the appended claims.

We claim:

1. A vehicle anti-theft device positionable between operating pedals of the vehicle and the floor of the vehicle to prevent operation of the pedals, comprising:
    first and second parallel supports extending upwardly from the floor and having angled base portions for resting on the floor;
    a transverse bar secured to and extending perpendicular to said support means adjacent an upper end thereof, said transverse bar having a first end extending substantially perpendicular thereto with a first opening therein and a second opening in said transverse bar spaced from said first end;
    a locking bar having a first portion parallel to said transverse bar, a spigot secured to one end of said first parallel portion for insertion into said first opening in said transverse bar, and an aperture in said locking bar which aligns with said second opening in said transverse bar through which a locking device may be inserted to prevent withdrawal of the spigot from the first opening,
    said locking bar and said transverse bar defining an enclosed space when secured to one another by the locking device whereby upon placing said transverse bar beneath a support arm of one of said operating pedals and placing said locking bar above the support arm with said spigot inserted axially into said first opening the support arm will be exposed within the enclosed spaced to prevent the pedal from being depressed.

2. A vehicle anti-theft device as recited in claim 1 wherein said transverse bar further comprises a second end extending parallel to said first end and in the same direction to form a substantially U-shaped bar, an extension perpendicular to said second end and extending away from said first end with said second opening being located in said extension.

3. A vehicle anti-theft device as recited in claim 2 further comprising an inverted U-shaped bar transversely secured to said first and second supports adjacent the lower ends thereof and extending away from said supports for placement behind a second operating pedal to restrict the use thereof.

4. A vehicle anti-theft device as recited in claim 3 wherein said locking bar is a linear-shaped member having said spigot extending linearly from one end thereof and said aperture being disposed in an opposite end.

5. A vehicle anti-theft device as recited in claim 1 further comprising a pin secured to said transverse bar and extending towards said locking bar within said enclosed space to further restrain the movement of the pedal support arm within said enclosed space.

6. A vehicle anti-theft device as recited in claim 5 wherein said transverse bar further comprises a second end extending parallel to said first end and in the same direction to form a substantially U-shaped bar, an extension perpendicular to said second end and extending away from said first end with said second opening being located in said extension.

7. A vehicle anti-theft device as recited in claim 6 further comprising an inverted U-shaped bar secured to a lower end of at least one of said first and second supports and extending perpendicular thereto away from said supports for placement behind a second operating pedal to restrict the use thereof.

8. A vehicle anti-theft device as recited in claim 5 wherein said transverse bar has an extended portion extending past said second hole in a direction opposite said first end and is provided with a second end substantially perpendicular thereto in a direction opposite of said first end whereby said extended portion of said transverse bar may be disposed behind a second operating pedal to restrict the use thereof.

9. A vehicle anti-theft device as recited in claim 8 wherein said locking bar further comprises a second parallel portion connected to said first parallel portion by an intermediate portion with said aperture being disposed in said second parallel portion.

* * * * *